3,257,409
PROCESS FOR THE PRODUCTION OF ISOTHIAZOLE AND SUBSTITUTED ISOTHIAZOLE COMPOUNDS AND CERTAIN PRODUCTS THEREOF
Fritz Hübenett, Wiesbaden, Franz Flock, Bergen-Enkheim, Hansdieter Hofman, Frankfurt am Main-Rodelheim, and Dieter Wollenberg, Hausen, Offenbach, Germany, assignors to Hans J. Zimmer-Verfahrenstechnik, Frankfurt am Main, Germany
No Drawing. Filed Nov. 6, 1962, Ser. No. 235,835
Claims priority, application Germany, May 4, 1962, Z 9,388, Z 9,389, Z 9,390, Z 9,391
16 Claims. (Cl. 260—302)

This invention relates to a process for the production of isothiazole and substituted isothiazole compounds. It makes available a class of substances, the production of which has been extremely difficult heretofore. In accordance with the invention, a great variety of novel chemical compounds belonging to the class of thiazoles is successfully prepared.

While benzoisothiazole and its derivatives are known since long, isothiazole was described for the first time in 1956 (Adams and Slack, Chem. and Ind. 1956, 1232) and 3-methyl isothiazole in 1959 (Adams and Slack, J. Chem. Soc., 1959, 3061). Both substances have been obtained in amounts of grams only, viz. isothiazole itself by decomposition by oxidiation of 5-aminobenz-[d]-isothiazole through isothiazole-4,5-dicarboxylic acid, 4-monocarboxylic acid, its ester, hydrazide and azide by the Curtus reaction and by reducing diazotization of the 4-aminoisothiazole finally obtained with intermediate formation of benzylurethane. 3-methylisothiazole was obtained by a similarly complicated method starting from β-iminothiobutyramide. Since already the starting substances of this synthesis are compounds which are not readily available, only little importance can be attributed even for pharmaceutical industry to these methods which seem to be attractive in their conception.

It has now been found surprisingly that isothiazoles can be produced very easily from most simple petrochemicals in a conventional vapor phase reaction. Accordingly, the invention provides a process for the production of isothiazole and substituted isothiazole compounds, the process comprising reacting olefines and/or acetylene of the general formulae

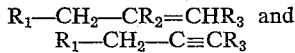

with sulfur dioxide and ammonia in the vapor phase at elevated temperatures in the presence of solid catalysts. In these general formulae, the groups $R_1$, $R_2$ and $R_3$ are like or different and may be hydrogen, alkyl, aryl, aralkyl, alkaryl, acyl, nitrile or alkoxy groups or halogen.

If, for example, propylene is reacted in accordance with the invention with $SO_2$ and $NH_3$ over large-surface solid catalysts, isothiazole itself is obtained in yields of about 50% or even more. Its identity is confirmed by comparison of its infrared spectrum with that already described in literature (Adams and Slack, J. Chem. Soc., 1959, 3061).

The process of the invention is operated at elevated temperatures. Particularly preferred is the temperature range between 200° and 500° C., it having been found to be very desirable to operate in the range between 250° and 400° C. The process may be operated at subatmospheric or elevated pressures, e.g., up to about 20 kgs./sq. cm., preferred being operation at atmospheric pressure.

The reaction is generally applicable to olefins having more than 3 carbon atoms so that alkyl derivatives of isothiazole, even in higher yields, are also obtainable by the same method. For example, the hitherto unknown 4-methyl isothiazole, the constitution of which was demonstrated by oxidation to form the already described (Adams and Slack, J. Chem. Soc., 1959, 3061) isothiazole-4-carboxylic acid and conversion to its methyl ester, could be prepared from isobutylene.

A very great number of substances are suitable as catalysts for the reaction, e.g., normal activated charcoal, alumina, montmorillonite, diatomaceous earth and similar materials such as cracking catalysts. Additions such as zinc oxide, magnesia, etc., are of little influence on the reaction. Others, such as tungsten, molybdenum, iron, cobalt and nickel compounds and, in general, compounds of those metals of the intermediate group of the periodic table which occur in several stages of valency partially lead to better conversion rates and yields. The oxides or sulfides of elements of the 3rd to 8th subgroups of the periodic table catalyze the reaction when used alone or in combination. Especially the oxides or sulfides of tungsten, molybdenum, iron, cobalt and nickel increase the catalytic activity of activated charcoal, alumina and silica, e.g., kieselguhr, or of various silicates, e.g., montmorillonite, when used as additions.

Surprisingly, the type of catalyst obviously is not so critical for the process of the invention as one would expect for such a reaction. Nevertheless, improvements in conversion rates and yields which may be rather considerable are obtainable by modification of these catalysts. While, for example, pure silica catalyzes the reaction of isothiazole formation to a moderate degree only, silica which has been activated with small amounts of thoria has been found to be very useful. Very efficient catalysts can be obtained in a special embodiment of the process of the invention by activating solid catalysts preferably consisting of alumina or silica with small amounts of compounds of elements of the 1st to 6th main groups of the periodic table or of the lanthanides.

Catalysts which are suitable for the purposes of the invention are, for example, obtained with the free elements or compounds of lithium, sodium, potassium, rubidium, cesium, beryllium, magnesium, calcium, strontium, barium, boron, gallium, indium, thallium, germanium, tin, lead, arsenic, antimony, bismuth or tellurium.

Very satisfactory cataysts are, for example, obtained by modifying silica with beryllia or compounds of an alkali metal. The same action is exhibited by additions of boron oxide, rare earth oxides, tin, bismuth or tellurium oxides.

It is surprising that the additions of the type described already improve the usefulness of the catalyst when added in very small amounts of, for example, less than 1% or in the order of magnitude of only a few milligrams per kilogram. Occasionally, these additions are of little influence on the reaction proper but substantially facilitate the regeneration of the catalysts, e.g., by burning-off with air, which regeneration becomes necessary at periodic intervals. As an alternative, large-surface supporting materials other than alumina or silica may be modified or activated, catalytic activity of the supporting materials themselves being not excluded.

The reaction of the invention may, for example, be expressed by the following empirical equation:

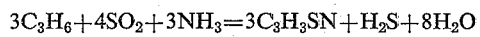

this equation being applicable to the production of isothiazole by reaction of propylene with $SO_2$ and $NH_3$. The molar ratios of the gases to be reacted may vary within wide limits. However, an excess of $SO_2$ should be avoided if possible since this does not only result in increased $CO_2$ formation but also in difficulties in processing due to formation of sulfur and increased production of polysulfides. An excess of $NH_3$ and olefin has been found to be favorable for the reaction. The reaction gases which, for example, have been freed from ammonium sulfide and ammonium carbonate by washing with water can be recycled in this case by suitable measures. Due to the process of the invention, isothiazole and its derivatives have become compounds which are commercially easy and cheap to produce. A considerable interest of pharmaceutical and paint industries can be expected from the characteristics described above.

A further application is in the solvent field, this being particularly due to the fact that a wide range of boiling points can be covered by the synthesis of any alkyl derivative. As was already mentioned, the isothiazoles are far superior in their solvent properties to the corresponding pyridines, the physical and part of the chemical characteristics of which are, as could be expected, largely identical with those of the isothiazoles. The agreement with the pyridines is, for example, apparent from the comparison of the boiling points given below.

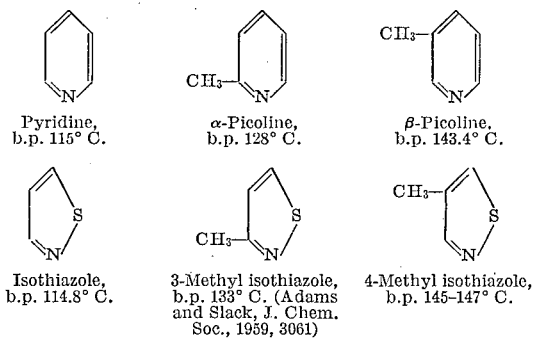

Pyridine, b.p. 115° C.  α-Picoline, b.p. 128° C.  β-Picoline, b.p. 143.4° C.

Isothiazole, b.p. 114.8° C.  3-Methyl isothiazole, b.p. 133° C. (Adams and Slack, J. Chem. Soc., 1959, 3061)  4-Methyl isothiazole, b.p. 145-147° C.

It has been mentioned above that the groups $R_1$, $R_2$ and $R_3$ in the olefins and acetylenes to be used in accordance with the invention and having the general formulae given above may have various meanings. Thus, the process of the invention is generally applicable to olefinic and acetylenic compounds having at least 3 carbon atoms, a decisive importance being not attributable to the other substituents unless they enter into secondary reactions under the reaction conditions which change the configuration comprising three carbon atoms, two of which are linked by a multiple bond. The substituents either reappear as corresponding substituents of the isothiazole ring formed or they have been replaced by other substituents due to side reactions. However, the above-mentioned substituents are generally stable in the temperature range of 200 to 500° C. to be used, although the lower temperatures of this range will be preferred in case of more sensitive or particularly reactive compounds. It can be avoided in most cases by the use of active catalysts so that the yield of isothiazole derivatives desired will then decrease.

The process of the invention permits, for example, the production of isothiazole nitrile from allyl cyanide. Methacrylonitrile is converted into isothiazole-4-carboxylonitrile which was found to be identical with the compound obtained from isobutylene via 4-methyl isothiazole. Methyl methacrylate, allyl methyl ether, isoprene, 1-methyl cyclohexene, 2,3-dimethyl butadiene, mesityl oxide, allyl benzene and dipentene can be reacted in an analogous manner. When using higher boiling compounds, it is recommended to operate under reduced pressure or to spray the compounds in the hot gas stream immediately upstream of the catalyst.

It appeared in a further embodiment of the invention that compounds which form the olefins or acetylenes mentioned above under the reaction conditions may also be used in addition to or in place of the olefins and/or acetylenes mentioned above. Thus, in this embodiment of the invention, formation of the unsaturated compound to be reacted and its reaction with $SO_2$ and $NH_3$ is effected in a single process step only.

For example, isopropyl alcohol under the conditions of the invention is converted into isothiazole in the same manner as is propylene. In an entirely analogous manner, tertiary butanol-4-methyl isothiazole and n-butyl acetate give a mixture of 3- and 5-methyl isothiazole, i.e., the same compounds which can be produced from the olefins formed by dehydration of the corresponding alcohols.

Thus, compounds which bear a free, etherified or esterified hydroxyl or mercapto group or a halogen atom in addition to a sufficient number of hydrogen atoms at a chain of at least three carbon atoms and which form compounds of the general formula given above with formation of water, hydrogen sulfide or hydrogen halide are generally suited for the process of the invention. These olefinic compounds may also be formed under the reaction conditions by decarboxylation of specific carboxylic acids such as, for example, β-methyl crotonic acid and then continue to react to form isothiazole derivatives.

Finally, in a further embodiment of the process of the invention, compounds which form sulfur dioxide and/or ammonia under the reaction conditions or which are equivalents of these mixtures may be charged to the reaction in place of free sulfur dioxide and/or ammonia. Thus, the same principle which was just explained with respect to the unsaturated hydrocarbon component is applicable in this case.

Sulfur dioxide may, for example, be replaced by sulfurous acid. The water vapor simultaneously formed does not exert a decisive influence on the reaction. Ammonia may, for example, be replaced by ammonium carbonate or ammonium carbamate. An influence on the reaction by carbon dioxide which is concomitantly formed cannot be observed. Mixtures of sulfur dioxide and ammonia as used in the process of the invention are obtainable directly from ammonium sulfite $(NH_4)_2SO_3$ or ammonium sulfinic acid amide $(NH_4)SO_2NH_2$ by cleavage of these compounds at the reaction temperatures.

Example 1

A gas stream consisting of equal parts by volume of propylene, sulfur dioxide and ammonia was reacted over activated alumina in a glass tube maintained at 350° C. The reaction product which initially was yellow and subsequently dark separated into two layers in a receiver maintained at 20° C. Unconverted propylene was condensed in a liquid air trap arranged downstream of the reactor. The organic layer was taken up in ether and the aqueous phase was extracted with the same solvent. The ether solutions were combined and the solvent was driven off and the residue distilled. A raw product which, according to analysis by gas chromatography, still contained about 4% of impurities was obtained in an amount of 35.2 grams from 39.5 grams of reacted propylene at a distilling temperature of 113 to 118° C. When fractionating in a spinning band column, the pure isothiazole showed a boiling point of 114.8° C. at 758 mm. Hg. The infrared spectrum was in agreement with that published by Adams and Slack (J. Chem. Soc., 1959, 3061). The refractive index $n_D^{20}$, was found to be 1.5318.

Example 2

Propylene, sulfur dioxide and ammonia in a molar ratio of 4:3:4 were passed over an activated charcoal catalyst at 200° C. When slowly increasing the temperature, liquid reaction products began to condense at a reaction temperature just below 250° C. in a receiver maintained at 20° C. After the temperature had been increased to 330° C., the reaction became more vigorous and the reaction products in the receiver separated into a lighter aqueous phase of greater volume and a darker organic layer. After steam distillation with recirculation of the aqueous distillate and treatment of the organic phase with solid potassium hydroxide, isothiazole was obtained in an amount of 46% of theory.

Example 3

Isobutylene at a rate of 22 liters/hr. and sulfur dioxide and ammonia each at a rate of 17 liters/hr. were passed over a catalyst containing 7.5% of molybdena and 3% of cobalt oxide on alumina. The reaction product obtained in the manner described in Example 1 was subjected to steam distillation and the distillate provided with alkali was subjected to continuous extraction with ether. After removal of the ether, the 4-methyl isothiazole produced distilled at 145–147° C. in a yield of 51% based on isobutylene reacted. Oxidation of the product with an alkaline permanganate solution gave isothiazole-4-carboxylic acid melting at 162° C. and already described in literature (Adams and Slack, J. Chem. Soc., 1959, 3061).

Example 4

Butene-2 at a rate of 8 liters/hr., sulfur dioxide at a rate of 12 liters/hr. and ammonia at a rate of 12 liters/hr. were passed at 310° C. over a catalyst consisting of a mixture of the oxides of silicon (90%), aluminum (9.7%), chromium (0.15%), sodium (0.1%) and vanadium and nickel (traces). The residence time was about 15 seconds based on the empty reaction space.

Condensation in a condenser downstream of the reactor gave a dark colored reaction product consisting of two phases. The aqueous phase was separated from this product. After steam distillation of the organic phase and drying of the resultant water-insoluble distillate with potash, the reaction product was worked up by distillation in a well separating distilling column. This resulted in three fractions of which that obtained at 84° C. in an amount of 32% on feed to the column was found to be pure thiophene. The second fraction obtained consisted of 3-methyl isothiazole boiling at 134° C. in an amount of 48.6% on the feed to the column. The third fraction in amount of 18.5% on the feed boiled at 144° C. and consisted of the previously unknown 5-methyl isothiazole in addition to a minor amount of impurities of less than 0.5%.

The composition of the reaction product obtained could be greatly influenced by the composition of the catalyst and by the temperature and residence time. For example, zirconia-containing catalysts gave a lower thiophene proportion and almost the reverse ratio between 3- and 5-methyl isothiazole.

Example 5

93 gms. of allyl cyanide were passed within 3 hours together with 9 liters/hr. of sulfur dioxide and 12 liters/hr. of ammonia through a tube heated at 300 to 320° C. and filled with about 250 ml. of a commercial pelletized cracking catalyst. The reaction product was taken up with ether, the ether evaporated and the residue fractionated. Unchanged allyl cyanide initially distils together with crotonic acid nitrile formed by isomerization. A fraction consisting of isothiazole nitrile is obtained at 130° C./15 mm. Hg.

Example 6

38 liters/hr. of a gaseous mixture of methacrylonitrile, sulfur dioxide and ammonia in a ratio by volume of 1.5:1:1.3 are passed over a synthetic aluminum silicate catalyst at 320° C. and with a residence time of 12 seconds based on the empty catalyst space. The dark-colored reaction products obtained by condensation are extracted with ether and the extract is dried with potash and processed by distillation. Part of the methacrylonitrile fed is recovered unchanged. The residue from distillation solidifies on cooling and is recrystallized from a mixture of petroleum ether and benzene. The reaction product desired is obtained in a very pure form due to the use of activated charcoal. It has the form of colorless crystal needles which are water-soluble and have a melting point of 87° C. Elementary analysis and saponification to form isothiazole-4-carboxylic acid known from literature and having a melting point of 162° C. indicate that 4-cyanoisothiazole has been formed in the reaction.

Example 7

48 gms. of evaporated alpha methyl styrene, 13 liters of sulfur dioxide and 12 liters of ammonia are hourly passed at 330° C. over 300 ml. of a catalyst consisting of 92% of silica, 7.8% of zirconium dioxide and 0.1% each of vanadium pentoxide and chromia. After condensation of the reaction products leaving the reactor, the aqueous phase is separated and the organic phase is washed with a 10% sodium hydroxide solution and dried with calcium carbonate. When processing the product by distillation, unconverted alpha methyl styrene distils initially. As the second fraction, 4-phenyl isothiazole is obtained at 140° C. and 2 mm. Hg in a yield of 66% of theory. The initially liquid product crystallizes slowly and can be recrystallized from petroleum ether. It then shows a melting point of 37 to 38° C.

β-Methyl styrene can be reacted in the same manner to form 5-phenyl isothiazole melting at 40 to 41° C. However, the yields are somewhat lower.

Example 8

Tertiary butanol was passed with an equimolar amount of sulfur dioxide and a slight excess of ammonia at 300° C. over a catalyst which consisted of silica activated with 1% of thoria. The reaction product obtained by condensation consisted of an aqueous layer and an organic layer. The organic layer was taken up in ether, the aqueous layer extracted with ether, the ether solutions were combined, the solvent was driven off and the residue distilled. The resultant 4-methyl isothiazole distilled at 145–147° C. and was obtained in a yield of 38% of theory.

Example 9

Methyl acetylene, ammonia and sulfur dioxide in a molar ratio of 2:2:1 were passed at 280° C. over a catalyst which consisted of a mixture of the oxides of silicon (90%), aluminum (9.7%), chromium (0.15%), sodium (0.1%), vanadium (5 p.p.m.) and nickel (4 p.p.m.). The reaction product was processed in the manner described in Example 8. Isothiazole (B.P. 114.8° C./758 mm. Hg; $n_D^{20}=1.5318$) was obtained in a yield of 25% of the theoretical.

Example 10

Tertiary butanol and ammonium sulfinic acid amide $(NH_4)SO_2NH_2$ in a molar ratio of about 1:0.5 are introduced into a tubular reactor heated to 300° C. and containing silica activated with 1% thoria as the catalyst. The reaction product comprising an organic layer and an aqueous layer is taken up and extracted with ether. The ether solutions are combined and fractionated after evaporation of the ether. 4-methyl isothiazole (B.P. 145–147° C.) was obtained in a yield of 38% of theory.

Example 11

Isobutylene, sulfur dioxide and ammonia in a molar ratio of 1:1.2:1 were passed over a catalyst heated at about 300° C. and consisting of silica modified with 1% of beryllia. The reaction product which initially was yellow and subsequently acquired a dark color separated into two layers in a receiver maintained at 20° C. The organic layer was taken up in ether and the aqueous layer was repeatedly extracted with ether. The extracts were combined, the solvent driven off and the residue distilled. At 145–147° C., 4-methyl isothiazole distilled in an amount which corresponded to a theoretical yield of 38%.

Example 12

Isobutylene, $SO_2$ and $NH_3$ at hourly rates of 8 liters/hr., 10 liters/hr. and 9 liters/hr., respectively, were passed at 325° C. over 200 ml. of a modified zirconia-silica catalyst. The catalyst consisted of 92% of silica, 6.5% of zirconia, 0.15% of chromium-III-oxide, 0.08% of vanadium pentoxide and 0.05% of potassium oxide.

When processing the reaction products in the manner described in Example 11, 4-methyl isothiazole was obtained in a yield of 61% of the theoretical.

*Example 13*

Propylene, sulfur dioxide and ammonia in the molar ratio were reacted at 340° C. in a reactor filled with a montmorillonite catalyst modified by addition of about 1.5% of beryllium oxide. When processing the reaction products obtained in the manner described in Example 11, isothiazole was obtained at 115° C. in a yield of 36.3% of theory.

What is claimed is:

1. Process for the preparation of isothiazole compounds which comprises reacting a member selected from the group consisting of olefins and acetylenes each having at least three carbon atoms and having no substituents other than members selected from the group consisting of hydrogen, alkyl, aryl, aralkyl, alkaryl, alkanoyl, nitrile, alkoxy, and halogen, with sulfurdioxide and ammonia, at a temperature of from 200 to 500° C. in the presence of a solid catalyst selected from the group consisting of diatomaceous earth, activated charcoal montmorillonite, alumina, silica, oxides and sulfides of elements of the 3rd to 8th sub-groups of the periodic table, elemental lithium, sodium, potassium, rubidium, cesium, beryllium, magnesium, calcium, strontium, barium, boron, gallium, indium, thallium, germanium, tin, lead, arsenic, antimony, bismuth, tellurium, and mixtures thereof.

2. Process according to claim 1, wherein said reaction is effected at a temperature of between 250 and 400° C.

3. Process according to claim 1, wherein said reaction is effected at a pressure of from atmosphere up to about 20 kg. sq. cm.

4. Process according to claim 1, wherein said reaction is effected at sub-atmospheric pressure.

5. Process according to claim 1, which comprises employing the sulfur dioxide in an amount less than that stoichiometrically required for completion of the reaction.

6. A process for the preparation of isothiazole, which comprises reacting propylene, sulfur dioxide and ammonia at 350° C. in the presence of activated alumina as catalyst and recovering the isothiazole thereby formed.

7. Process for the preparation of 4-cyano isothiazole, which comprises reacting methacrylonitrile, sulfur dioxide and ammonia at a temperature of 320° C. in the presence of a synthetic aluminum silicate catalyst and recovering the 4-cyano isothiazole thereby formed.

8. A process for the preparation of 4-phenyl isothiazole, which comprises reacting alpha methyl styrene, sulfur dioxide and ammonia at a temperature of 330° C. in the presence of a catalyst consisting of 92% silica, 7.8% zirconium dioxide, 0.1% vanadium pentoxide and 0.1% chromia, and recovering the 4-phenyl isothiazole thereby formed.

9. A process for the preparation of 5-phenyl isothiazole, which comprises reacting beta-methyl styrene, sulfur dioxide and ammonia at a temperature of 330° C. in the presence of a catalyst consisting of 92% silica, 7.8% zirconium dioxide, 0.1% vanadium pentoxide and 0.1% chromia, and recovering the 5-phenyl isothiazole thereby formed.

10. Process according to claim 1 wherein said catalyst is a mixture of a member selected from the group consisting of activated charcoal, alumina, and silica with a member selected from the group consisting of the oxides and sulfides of tungsten, molybdenum, cobalt, iron, and nickel.

11. Process according to claim 1 wherein said catalyst is a mixture of silica with a member selected from the group consisting of beryllia, alkali metal compounds and oxides of boron, rare earths, tin, bismuth, and tellurium.

12. A process for the production of isothiazole which comprises reacting methyl acetylene, ammonia and sulfur dioxide at a temperature of 280° C. in the presence of a catalyst comprising a mixture consisting of 90% oxides of silicon, 9.7% aluminum oxide, 0.15% chromium oxide, 0.1% sodium oxide, 5 p.p.m. vanadium oxide, 4 p.p.m. nickel oxide, and recovering the isothiazole thereby formed.

13. A process for the preparation of 5-methyl-isothiazole which comprises reacting butene-2, sulfur dioxide and ammonia at a temperature of 310° C. in the presence of a catalyst comprising a mixture consisting of 90% oxides of silicon, 9.7% aluminum oxide, 0.15% chromium oxide, 0.1% sodium oxide, and traces of vanadium and nickel oxides.

14. Process for the preparation of 3-methyl isothiazole which comprises reacting butene-2, sulfur dioxide and ammonia at a temperature of 310° C. in the presence of a catalyst comprising a mixture consisting of 90% oxides of silicon, 9.7% aluminum oxide, 0.15% chromium oxide, 0.1% sodium oxide, and traces of vanadium and nickel oxides.

15. 4-phenyl-isothiazole.

16. 5-phenyl-isothiazole.

References Cited by the Examiner

Adams et al.: Chem. Abstracts, vol. 54, columns 12113–12115 (1960).

HENRY R. JILES, *Acting Primary Examiner.*

ALTON D. ROLLINS, *Assistant Examiner.*